Figure 1:
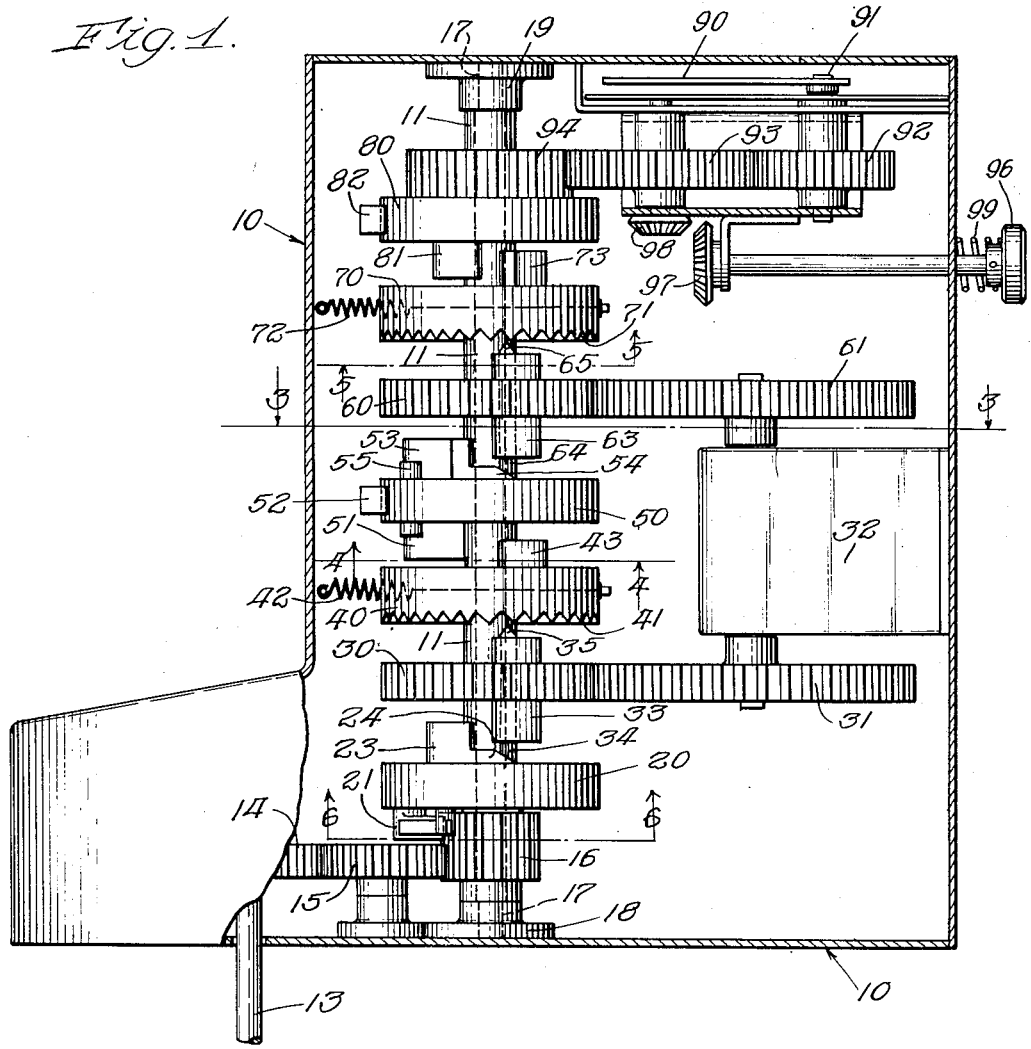

Aug. 25, 1953 F. C. AMSBARY, JR., ET AL 2,650,026
REGISTER FOR METERS
Filed June 2, 1951 2 Sheets-Sheet 1

Inventors:
Frank C. Amsbary Jr.,
Stuart G. Moore,
By Schroeder, Merriam,
Hofgren and Brady, Attys.

Aug. 25, 1953     F. C. AMSBARY, JR., ET AL     2,650,026
REGISTER FOR METERS
Filed June 2, 1951     2 Sheets-Sheet 2
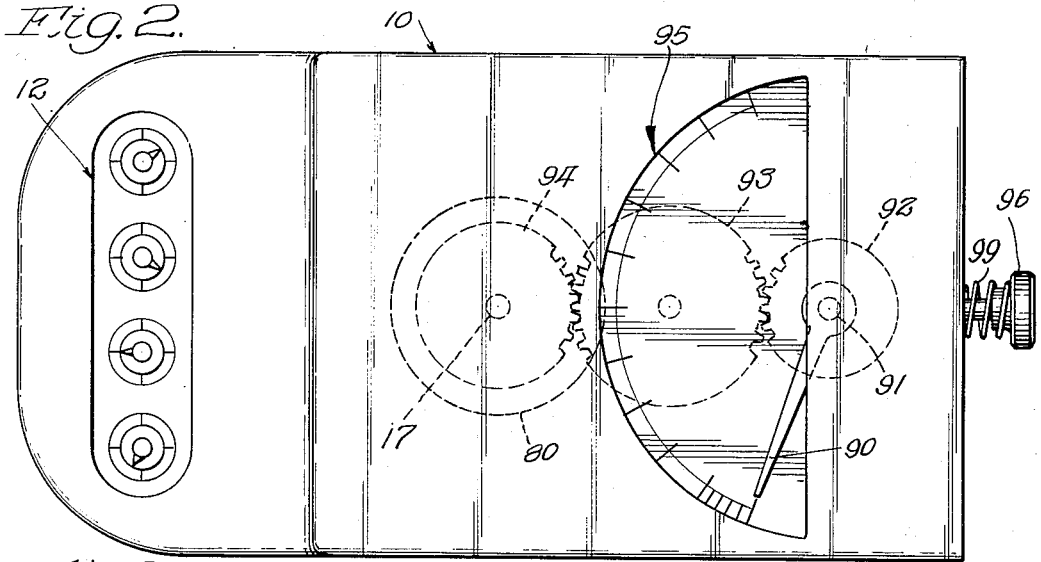
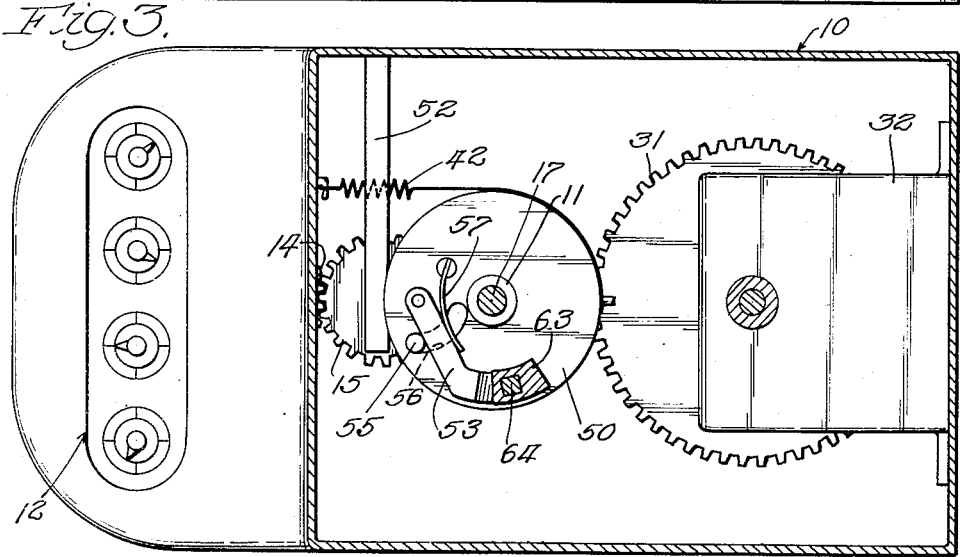
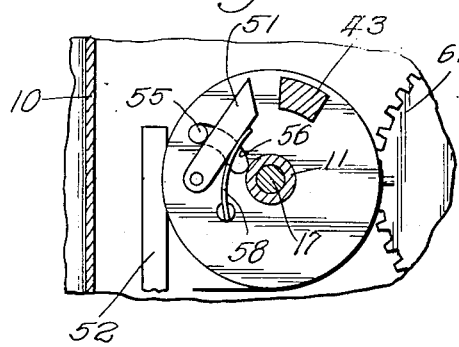
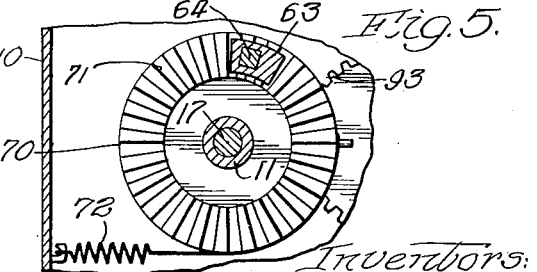
Inventors:
Frank C. Amsbary Jr.,
Stuart G. Moore,
By Schroeder, Merriam,
Hofgren & Brady, Attys.

Patented Aug. 25, 1953

2,650,026

UNITED STATES PATENT OFFICE 2,650,026

REGISTER FOR METERS

Frank C. Amsbary, Jr., and Stuart G. Moore, Champaign, Ill.

Application June 2, 1951, Serial No. 229,609

26 Claims. (Cl. 235—104)

1

This invention relates to a demand meter register and more particularly to a meter adapted to give a direct reading of peak load placed on a utility system during a time period of predetermined length.

Consumers of utility service such as gas, water and electricity pay for the service in terms of the quantity used. The regulating bodies which determine the rates which utilities may charge for their services have recognized that certain consumers place a greater demand on the utilities system, and because of this fact, should pay a higher rate than other consumers who do not place such a high demand on the system. As an example, one consumer might use 10,000 gallons of water each day and would require the whole 10,000 gallons in a two-hour period. Such low load factor (the ratio of use to demand) accounts are not, under presently accepted rate structures, economically self-supporting. A second consumer also requires 10,000 gallons of water a day but may draw it at a fairly even rate over a ten-hour period. Obviously then, the first consumer must be provided with facilities to deliver 5,000 gallons an hour, whereas the second consumer will only need facilities capable of delivering 1,000 gallons per hour. The first consumer, therefore, requires an investment which is entirely out of proportion to the revenue produced and should be charged a higher rate than the consumer whose demands produce a favorable load factor.

Regulating bodies have determined that a peak demand in order to be considered a peak, should last at least fifteen minutes; and, therefore, have indicated that the critical demand rate should be based upon the maximum, during a definite period (for example, 30 or 60 days) of the minimum demands occurring in each of the fifteen minute or larger periods during the 30 or 60 days.

Thus, in order to meet the requirements of the regulating bodies for an increased rate based upon the demand of any customer, an instrument must be provided which will measure the flow during each minute of each fifteen minute period and will, in its operation, "remember" the smallest flow per minute during that period. The instrument must be further designed to select, during a billing period, for example, 30 or 60 days, as the case may be, the greatest or maximum flow "remembered." The apparatus of this invention provides such an instrument in the form of a meter which operates in response to the flow during each minute of the basic billing period. In

2 operation, the meter of this invention selects, during the first fifteen minute period for example, the smallest flow per minute and "remembers" that flow in a registering or memory device. At the end of that fifteen minute period the "memorized" flow is transferred to a registering mechanism which registers that minimum or smallest flow. The device is effective during each fifteen minute period of the balance of the billing period to change the registered flow in the event that any minimum flow during any subsequent fifteen minute period exceeds the minimum flow previously registered, so that at the end of the billing period a meter reader need only to inspect the final record or register mechanism to determine what is the "maximum of the minimums" or in other words to determine which was the largest flow of the smallest or minimum flow during each fifteen minute interval during the billing period.

By way of example, the minimum flow during the first fifteen minute period may be 50 gallons per minute which would be "remembered." Subsequent minimum flows, if less would not be "remembered" and if more, would replace the flow rate previously "remembered" and so on 24 hours a day for the length of the billing period.

Figure 6:
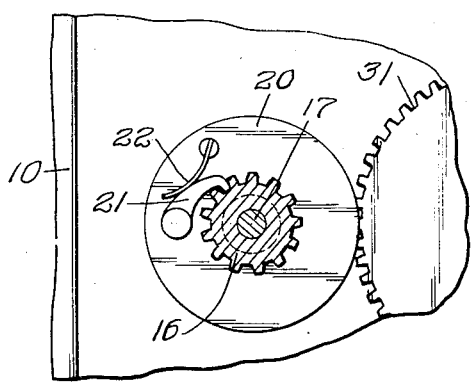

The demand meter of this invention will be described with reference to a particular embodiment thereof illustrated in the accompanying drawings, in which:

Fig. 1 is a side elevational view of the demand meter partially broken away to show the interior mechanism thereof; Fig. 2 is a top plan view of the meter illustrated in Fig. 1; Fig. 3 is a sectional view through the meter taken as indicated by line 3—3 in Fig. 1; Fig. 4 is a fragmentary sectional view taken substantially along line 4—4 in Fig. 1; Fig. 5 is a fragmentary sectional view taken substantially along line 5—5 in Fig. 1; and Fig. 6 is a fragmentary sectional view taken substantially along line 6—6 in Fig. 1.

The embodiment of the invention in the accompanying drawings is particularly intended for use with a water meter of the displacement type. A housing 10 is provided for containing the clockworks (not shown) operating the dials 12 of the ordinary displacement type water meter. The housing 10 also carries the works of the demand meter and both are operated at least initially by spindle 13 adapted to be rotated by movement of water through the displacement disk of the usual water meter. Adapters may be provided for mounting the housing 10 directly upon the casing of the displacement type meter and such adapters will permit the use of a single demand meter on the various sizes and makes of quantity measuring meters now in existence.

In Fig. 1 of the drawings, the spindle 13 rotates a gear 14 mounted on its upper end and an idler gear 15 meshed therewith and with a gear 16 adapted to drive a measuring wheel 20. The gear 16 is mounted on a spindle 17 having end bearings 18 and 19 secured to the housing 10. Each of the operative wheels of the demand meter is mounted on the spindle 17 and spacers 11 are provided between them so that each may be freely rotatable within certain limitations to be described. The measuring wheel 20 carries a ratchet 21 urged toward the teeth of gear 16 by a leaf spring 22. The ratchet drives the wheel 20 counter-clockwise, as viewed in Fig. 6, upon counter-clockwise movement of the gear 16 and also permits measuring wheel 20 to be rotated faster than the gear 16 under certain conditions to be described.

With a given size pipe running through the ordinary displacement type water meter, only a pre-determined maximum quantity of flow may be handled. The gear train between the spindle 13 and the wheel 20 is so chosen that for maximum flow during an incremental period, herein chosen as one minute for purposes of illustration, measuring wheel 20 will be rotated 350° from its starting position. Lesser rates of flow will rotate the wheel 20 in angular proportion to the maximum rotation of 350°. This maximum rotation is an arbitrary figure based upon 360° minus the angle subtended by the dog 23 secured to the wheel on the side opposite the gear 16. All the dogs to be described are made to subtend an equal angle, here shown as 10° on each wheel.

The only power drain placed on the displacement water meter is to drive the measuring wheel 20 through the connected gear train. All other power used to operate the demand meter is supplied by a spring wound or synchronous motor 32.

At the end of each minute of time, a first transferring unit including a reciprocating wheel 30 and a transfer wheel 40 comes into play to register the quantity of flow during the preceding minute upon a storage or retaining wheel 50. The reciprocating wheel 30 is provided with gear teeth on its periphery meshed with a power driven wheel 31 actuated by a spring wound or synchronous electric motor 32. The motor 32 is commercially available and is provided with clutches (not shown) to operate the gear 31 to rotate the reciprocating wheel 30 through 360° at the end of each minute. This action occurs very rapidly, as for example within a time lapse of two or three seconds.

The reciprocating wheel 30 is provided with a dog 33 on its side having a pin 34 mounted for sliding action therein. The dog 23 on wheel 20 is provided with an inclined portion 24 upon which the pin 34 may ride upwardly so that the opposite pointed end 35 of the pin may be forced into the serrated face 41 of the transfer wheel 40. Obviously when the pin 34 engages the serrations 41 and the dog 33 comes in contact with the dog 23, which occur simultaneously, wheel 40 will be carried along with wheel 30. The pin 34 may be spring urged toward wheel 20, if desired.

Wheel 40 is provided with a spring 42 urging it in one direction to its point of beginning at which suitable stop means may be provided. A dog 43 on the upper side of wheel 40 extends outwardly from the side thereof for contacting a hingedly mounted dog 51 on the storage wheel 50.

All of the wheels mounted on spindle 17 rotate in the same direction, whether by power from motor 32 or other actuating means. Wheels 40 and 70, of course, return under action of springs through opposite rotation.

The operation thus far described includes the rotation of measuring wheel 20 to total the flow in terms of rotation thereof. At the end of a minute of time, the motor 32 causes the reciprocating wheel 30 to rotate through 360° and with the operation of the dog 33 and pin 34, wheel 40 will be carried along with wheel 30 through an arc of 360° minus the previous rotation of wheel 20. Wheel 50 is, of course, rotated as far as wheel 40. Spring 42 returns the wheel 40 to its point of beginning and may effect the release of the pin 34 from the serrations 41. A friction stop 52 engaging the periphery of storage wheel 50 retains the wheel in the position to which it has been rotated. Thus the quantity measurement on wheel 20 has, by virtue of the first transferring unit, been registered on the storage wheel 50 as a function of the quantity flow over time, or more simply stated, as a rate of flow proportional to the degrees of rotation of wheel 50.

Since the rotation of wheel 50 is inversely proportional to the rotation of wheel 20, the smallest quantity of flow registered on wheel 20 would result in the greatest rotation of wheel 50. This procedure is repeated at the end of each minute of time so that the minimum total flow at wheel 20 will be the only total which will be registered at the storage wheel 50.

Every fifteen minutes, the time period chosen for purposes of illustration, a second transferring unit including reciprocating wheel 60 and transferring wheel 70 is actuated by the motor 32 through a gear 61 meshed with the gear teeth of wheel 60 to transfer the stored rotation of wheel 50 to a registering wheel or second storage wheel 80. Reciprocating wheel 60 is provided with a dog 63 and a pin 64 having a pointed end 65 identical with the dog and pin provided on wheel 30. Wheel 70 is identical to wheel 40 and is provided with a spring 72 and serrations 71 on its face. Storage wheel 50 has a hingedly mounted dog 53 provided with a sloping surface 54 upon which the pin 64 may ride toward the serrations 71 on wheel 70. When the motor 32 operates at the end of the fifteen minute period to rotate wheel 60 through 360°, the pin 64 will eventually ride upwardly on the sloping surface 54 so that transferring wheel 70 will be rotated through an arc equal to 360° minus the previous rotation of wheel 50. With this rotation of wheel 70, a dog 73 thereon will contact dog 81 on wheel 80 to rotate that wheel through an arc equal to the arc through which wheel 70 is rotated. At the end of the 360° rotation of wheel 60, spring 72 returns wheel 70 to its point of beginning, however, a friction stop 82 retains wheel 80 at the position to which it was rotated.

As previously noted, the storage wheel 50 was rotated through a relatively great arc which corresponded to the smallest rotation of the measuring wheel 20 during one minute of time. At the end of fifteen minutes of time the second transferring unit has transferred the maximum rotation of wheel 50 back to a minimum rotation of wheel 80 which represents the smallest flow occurring during one minute of time within the previous fifteen minutes. The rotation of the registering wheel 80 thus represents the smallest incremental flow rate during the time period preceding.

This flow rate is indicated by a pointer 90 mounted on a spindle 91 to which gear 92 is secured and is rotated through an idler gear 93 meshed therewith and with gear 94 secured to the wheel 80. Thus a direct reading of the minimum flow rate occurring during a predetermined time period is given on the dial 95 by the position of the pointer 90.

Special provision must be made within the meter for a time increment during which no flow occurs. With particular reference to Fig. 3, it will be noted that the dog 53 is secured to a stop pin 55 extending through wheel 50 in an arcuate slot 56. A leaf spring 57 urges the dog 53 toward the periphery of the wheel so that it may be contacted by dog 63 on wheel 60. During a time increment of no flow, the measuring wheel 20 will, of course, receive no rotation. When the motor 32 causes the reciprocating wheel 30 to move through 360°, the transferring wheel 40 is immediately contacted by the pin 34 and is also carried through 360°. Also dogs 43 and 51, respectively on wheels 40 and 50, are immediately in contact if wheel 50 has not been previously moved and wheel 50 is also carried through 360°. If wheel 50 has previously registered some rotation, it will be carried to the beginning point. With such rotation of the retaining wheel 50, the dog 53 is proportioned to end up under the dog 63 which holds it biased toward the shaft 17 upon which the wheel is mounted. This action also lowers the dog 51 as seen in Fig. 4 toward the shaft by bearing between the stop pin 55 and the outer side of dog 51. Thereafter dog 43 on the reciprocating wheel 40 cannot contact the dog 51 to rotate the storage wheel 50. This condition will remain until the end of a time period when the second transferring unit will be activated, rotating wheel 60 through 360° to permit the hinged dogs on the wheel 50 to snap back to their original outward position under influence of springs 57 and 58 respectively. The springs 42 and 72 on the reciprocating wheels respectively, are sufficiently strong to move the pins out of their serrations at the end of each 360° of rotation, thus permitting the wheels to return to their original positions.

As an example of the operation of the meter, let it be assumed that the flow rate will be differentiated in one minute increments and that the smallest incremental flow rate will be determined on the basis of a fifteen minute time period. With the measuring wheel 20 rotating 350° with maximum flow, all lesser flows will be proportional thereto. Assume that during one minute of time 50% of capacity flow occurs. Wheel 20 will then be rotated 175° to total that flow. At the end of one minute motor 32 will rotate wheel 30 through 360° engaging wheel 40 and wheel 50 for 185° for transferring the total to the storage wheel 50. Wheel 50 now registers by 185° of rotation from its original position, a flow rate of 50% of capacity in the first minute. Suppose that in each succeeding minute the flow is greater than 50%. Thus wheel 50 will not be disturbed from its 185° position since the reciprocating wheel 40 will always be rotated less than 185° from its initial position. Thus dog 43 will never reach dog 51 to move the wheel 50.

The situation just described is one in which the first minute had 50% of capacity flow and all the succeeding minutes of the fifteen minute period had a greater flow. The second transferring unit is then operative to rotate the transferring wheel 70 and recording wheel 80 through 175° which will be recorded by pointer 90 as the minimum flow rate occurring during the previous fifteen minutes.

During a subsequent fifteen minute period, all of the incremental flow rates may be greater than 50%, as given in the above example, so that the pointer 90 would be moved to show a greater flow rate by the same operation as described above. Thus, in the first minute, 60% flow would result in a total on wheel 20 of 210° which would be transferred to the storage wheel 50 as 140°. If all succeeding incremental flow rates are larger, the storage wheel would not be disturbed and recording wheel 80 would be rotated from its initial position 210°. However, wheel 80 had received 175° of rotation from its initial position so that it would be moved only sufficient to make up the difference. The minimum flow rate of 60% in the second fifteen minute period would be recorded at the dial and pointer. The maximum of the minimum flows during succeeding fifteen minute periods is, thus, the only record retained by the meter.

When the quantity record 12 is read, a direct reading from the demand meter dial 95 may also be taken. At that time the service man should reset the demand meter to zero by pushing inwardly on knob 96 which will engage gear 97 with gear 98 by which wheel 80 and the pointer 90 may be returned to zero setting as is obvious. Ordinarily spring 99 retains the resetting mechanism inoperative. For various sizes of quantity measuring meters, various gear trains may be substituted between the spindle 13 and wheel 20 and between the registering wheel 80 and the dial pointer 90 as desired. The internal clockwork of the demand meter may remain identical for all installations with simple changes only in the gear trains as mentioned.

The shaft 17 upon which the various wheels of the demand meter are mounted, may be placed in any position desired. It is contemplated that the shaft may, for example, be horizontal instead of vertical as shown. No change in operation results from the particular positioning of the shaft.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A flow meter register for indicating the minimum flow during a succession of time periods comprising, a measuring wheel for totalizing the flow during a time increment substantially smaller than said time period, said wheel measuring flow in terms of rotation thereof from a starting position, a storage wheel for storing the total of the flow during one time increment in terms of rotation thereof, a transfer clutch operable at the end of the first time increment to engage said wheels and transmit the total from the measuring wheel to the storage wheel, said transfer clutch connecting said wheels for rotating the storage wheel in amount inversely proportional to the rotation of the measuring wheel and operable at the end of succeeding time increments to transmit only totals less that the first total stored, timed power means for operating said transfer clutch, a period minimum flow registering wheel and a second transfer clutch operable by said timed power means at the end of the first time period to transmit the stored total from the storage wheel to the registering wheel and operable at the end of succeeding time periods to transmit only stored totals greater than the total registered on the registering wheel whereby the maximum of the minimum incremental flow rates is the only flow rate registered.

2. A flow meter register for indicating the minimum flow during a succession of time periods comprising, a first rotatable member for totalizing the flow during a time increment substantially smaller than said time period, said member measuring flow in terms of rotation thereof, a first storage member for storing the total of the flow during any one time increment in terms of rotation thereof, a first transfer means operable at the end of the first time increment for transmitting the total from the first rotatable member to the first storage member and operable at the end of succeeding time increments to transmit only totals less than the total stored, a second storage member rotatable to indicate incremental period flow within a time period, and a second transfer means operable at the end of the first time period for transmitting the stored total from the first storage member to the second storage member and operable at the end of succeeding time periods to transmit only stored totals greater than the stored total therein whereby the maximum of the minimum incremental flows is registered.

3. A flow meter register for indicating the minimum flow during a succession of time periods comprising, a first rotatable member for totalizing the flow during each period in terms of rotation thereof, a second rotatable member for storing the total of the flow during any one period in terms of rotation thereof, means operable at the end of the first period for transmitting the total from the first rotatable member to the second rotatable member and operable at the end of succeeding periods to transmit to the second rotatable member only totals less than the total stored therein, a rotatable registering member for registering the minimum flow of a succession of time periods in terms of rotation thereof and means operable at the end of a succession of time periods for transmitting the stored total from the second rotatable member to the registering member and operable at the end of a like number of time periods to transmit to the registering member only stored totals greater than the then registered total.

4. A flow meter register for indicating the minimum flow during a succession of flow periods comprising, a first rotatable member for totalizing the flow during each period in terms of rotation thereof, a second rotatable member for storing the total of the flow during any one period in terms of rotation thereof, and means operable at the end of the first period for transmitting the total from the first rotatable member to the second rotatable member and operable at the end of succeeding periods to transmit to the second rotatable member only totals less than the total stored therein and timed power means for operating said transmitting means.

5. A flow meter register for indicating the minimum flow during a succession of flow periods comprising, means movable in proportion to quantity of flow for totalizing the flow during each period, movable means for storing the total of the flow during any one period, and transferring means connectable with the totalizing means and the storage means operable at the end of the first period to transmit said total to the storage means and operable during succeeding periods to transmit to the storage means only totals less than the total stored therein and timed power means for operating the transfer means.

6. A flow meter register for indicating flow during a predetermined period comprising, means for totalizing the flow during said period, means for storing the total of the flow, and means operable at the end of a predetermined time interval to transmit said total from the totalizing means to the storage means in inverse ratio.

7. A flow meter register as specified in claim 6 in which means are provided for zeroizing the totalizing means at the end of each said time interval.

8. A flow meter register for indicating the minimum flow during a succession of flow periods comprising, means for totalizing the flow during each period, means for storing the total of the flow during any one period, and means operable at the end of the first period for transmitting the total from the totalizing means to the storage means and operable at the end of succeeding periods to transmit to the storage means only totals less than the total stored therein.

9. A flow meter register for indicating the minimum flow during a succession of predetermined time periods comprising, means for totalizing the flow during a succession of time increments less than the time period, means for storing the total of the flow during any one increment, means operable at the end of the first increment for transmitting the total from the totalizing means to the storage means and operable at the end of succeeding increments to transmit to the storage means only totals less than the total stored therein whereby said storage means stores the minimum incremental flow, means for zeroizing the storage means at the end of each predetermined time period and means for storing the maximum of a succession of minimum flows.

10. In a flow meter register adapted to give a direct reading of minimum flow during a time period of greatest quantity flow, means for differentiating quantity flow, comprising: timed power means for operating the register; a measuring element movable from its initial position in response to quantity flow for totalizing the flow during a time increment substantially less than the time period; a storage element movable from its initial position to indicate flow rate during a time increment and for receiving the total measured by the measuring element; and a transfer clutch means engageable with the measuring and storage elements and operable at the end of the first time increment to transmit movement of the measuring element to the storage element in inverse proportion and operable at the end of succeeding time increments to transmit only incremental flow totals less than the then stored total on the storage element whereby the position of the storage element indicates the smallest of succeeding increment flow rates.

11. In a flow meter register, flow differentiating means, comprising: a rotatable measuring element adapted to measure quantity flow in terms of rotation of the element, means correlating said rotation to less than 360° for full capacity flow during a time increment; means operable at the end of a predetermined time increment for storing the measure of the flow including a rotatable storage element and a transferring unit engageable with the measuring element and storage element to rotate the latter from a starting position in inverse proportion to the former, and means for holding said storage element in any position to which it is rotated whereby the arcuate position of the storage element indicates the smallest total flow during a preceding time increment.

12. A flow rate meter register, comprising: a rotatable measuring wheel adapted to measure total quantity flow in terms of rotation of the wheel from its initial position through less than one turn; a storage wheel adapted to measure flow rate in terms of rotation thereof from its initial position; flow differentiating means positioned between said wheels and having means for selectively connecting the wheels for concurrent rotation; timed power means for rotating said differentiating means through one turn at the end of successive incremental time lapses, said connecting means being operable to connect said wheels after rotation of the differentiating means through an arc equal to the previous rotation of the measuring wheel; and means for registering the largest incremental flow rate indicated by said storage wheel at the end of successive time period lapses, said time period being substantially greater than said time increment.

13. A flow rate meter register, comprising: a measuring wheel adapted to measure quantity flow in terms of rotation of the wheel from an initial position, drive means correlating said rotation to less than 360° for full capacity flow occurring over a predetermined time increment; a storage wheel adapted to indicate flow rate in terms of rotation thereof from its initial position; a first transferring means rotatable through 360° at the end of each time increment and adapted to rotatively connect the measuring wheel and the storage wheel through an arc of 360° minus the previous rotation of the measuring wheel for transferring the total of the measured flow to the storage wheel; a registering wheel adapted to indicate minimum incremental flow rate during a predetermined time period greater than said time increment in terms of rotation thereof from a starting position; second transferring means rotatable through 360° at the end of each time period and adapted to rotatively connect the storage wheel and registering wheel through an arc of 360° minus the previous rotation of the storage wheel; and timed power means for respectively rotating said first and second transferring means at the end of each time increment and time period.

14. A meter register for determining minimum flow of a medium during a succession of time periods, comprising: timed power means for operating the register; means for totalizing the flow during a time increment substantially smaller than said time period including, a measuring wheel rotatable in response to flow; means for storing the measured total at the end of each time increment including, a storage wheel, and a first transfer means operable at the end of the first increment to transmit the measured total from the measuring wheel to the storage wheel and operable at the end of succeeding time increments to transmit only measured totals less than the total then stored whereby the position of the storage wheel indicates the minimum incremental flow of the preceding time increments; and means for registering the stored incremental flow total including, a recording wheel, and a second transfer means operable at the end of the first time period to transmit the stored total from the storage wheel to the registering wheel and operable at the end of succeeding time periods to transmit only stored totals greater than the then stored total whereby the position of the registering wheel indicates the minimum incremental flow rate during the preceding time period during which flow was greatest.

15. A meter register as specified in claim 14, in which a gear train is connected with the measuring wheel to provide rotation thereof through an arc of less than 360° during maximum quantity flow of the medium for one time increment.

16. A meter register as specified in claim 14, in which said first and second transfer means are driven by said timed power means independent of means for rotating said measuring wheel.

17. A meter register as specified in claim 14, in which said storage wheel is provided with means rendering it inoperative following a time increment of zero flow of the medium, and operation of said second transfer means being adapted to return the storage wheel to its initial operative position at the end of each time period.

18. A meter register as specified in claim 14, in which said first transfer means returns said measuring wheel to its initial position of zero rotation at the end of each time increment.

19. A meter register as specified in claim 14, in which said measuring wheel, storage wheel and recording wheel are mounted in spaced relation on the same shaft with said transfer means being positioned respectively between the former and latter two wheels.

20. A differentiating meter register for automatically determining flow rate of a medium during a predetermined time period, comprising: a measuring wheel rotatable in response to quantity of flow, said wheel being rotated through an arc less than 360° for maximum flow over a predetermined time increment; a storage wheel adapted to hold the measured total of quantity flow during the time increment by rotation thereof in inverse proportion to the rotation of the measuring wheel; a first transferring unit operable at the end of each time increment to rotate itself 360° and to rotate the storage wheel through an arc equal to 360° minus the rotation of the measuring wheel, said measuring wheel and transferring unit being returned to the initial position at the end of said 360° rotation; a registering wheel rotatable to indicate minimum flow during the time period; and a second transferring unit selectively interconnecting the storage wheel and registering wheel for rotating the latter through an arc inversely proportional to the rotation of the former at the end of each time period, timed power means for operating said transferring units, said time period being substantially greater than said time increment whereby the position of the registering wheel may indicate the smallest total flow occurring over one time increment within the time period during which flow was greatest.

21. A flow meter register for indicating the minimum flow during a succession of time periods of predetermined length, comprising: a measuring wheel for totalizing flow during a time increment substantially smaller than said time period; a gear train for driving said measuring wheel from a zero position through a maximum arc less than 360° for full capacity flow over a time increment; a storage wheel adapted to be rotated from its initial position for storing the total of the flow during any one increment; a transfer unit, including a driven wheel adjacent the measuring wheel and a transfer wheel mounted on the shaft adjacent the storage wheel, for transmitting the total from the measuring wheel to the storage wheel, a clutch member carried on said driven wheel for locking the driven wheel and transfer wheel together after rotation of the unit through an arc equal to the angular rotation of the measuring wheel in totalizing the flow, a member on said driven wheel for engaging the measuring wheel and a member on said transfer wheel for moving the storage wheel whereby rotation of the measuring wheel may be transmitted in inverse proportion to the storage wheel to indicate minimum incremental flow; timed power means for operating said transfer unit; and means operable at the end of succeeding time periods for storing the maximum of a succession of minimum incremental flows.

22. A flow meter register as specified in claim 21, in which the last named means comprises a registering wheel rotatable to indicate the maximum of a succession of minimum incremental flows and a second transfer unit mounted between said storage wheel and the registering wheel, said second transfer unit being operable at the end of the first time period to transmit the stored total from the storage wheel to the registering wheel in rotation of inverse proportion and operable at the end of succeeding time periods to transmit only stored totals greater than the first transmitted to the registering wheel whereby only the minimum incremental flow occurring during the preceding time period of greatest flow is recorded.

23. A flow meter register as specified in claim 21, in which the last named means comprises a second transfer unit provided for transmitting the stored total from the storage wheel to a recording wheel, said second transfer unit including a second driven wheel adjacent the storage wheel, a dog on the second driven wheel, a dog on the storage wheel for engaging the dog on the second driven wheel, said storage wheel dog being pivoted for biasing toward the center of the wheel following an increment time of zero flow by repose under the dog of the second driven wheel, a similar pivoted dog on the other side of the storage wheel for contact with the first transfer unit and adapted to be held biased toward the center of the wheel after an increment of zero flow to render the storage wheel inoperative and means for rendering the storage wheel operative at the end of each time period.

24. A flow meter register for indicating the minimum flow during a succession of time periods of predetermined length, comprising: a shaft for mounting wheels rotatably thereon; a measuring wheel on the shaft for totalizing flow in terms of rotation thereof through less than one turn for flow during an increment of time less than said time period, said measuring wheel having a laterally extending dog; a storage wheel on the shaft for receiving and storing an incremental flow total in terms of rotation thereof through less than one turn, said storage wheel having a driving dog and a holding means for holding the wheel in any position to which it is rotated; a transfer unit on the shaft between said measuring wheel and storage wheel and including a driven wheel adjacent the measuring wheel and a transfer wheel adjacent the storage wheel, said driven wheel having a laterally extending dog with a movable pin therein for locking the transfer unit wheels together upon contact of the driven wheel dog and measuring wheel dog, said transfer wheel having a driving dog facing the storage wheel for moving the latter by contact with said driving dog whereby the rotation of the measuring wheel in totalizing the flow may be transmitted to inversely proportional rotation of the storage wheel to indicate minimum incremental flow; timed power means automatically operable at the end of each succeeding time increment to rotate said transfer unit driven wheel one turn; registering means for registering the maximum rotation of the storage wheel during succeeding time periods and means for transferring said maximum rotation to the registering means.

25. A device for measuring a quantity during each of a succession of time periods and indicating the minimum quantity measured during said succession of time periods comprising means movable in proportion to the amount of the quantity for totalizing the amount during each period, movable means for storing the total during any one period, and transferring means operable at the end of the first period to transmit said total to the storage means in terms of inversely proportional movement thereof and operable during succeeding periods to transmit to the storage means only totals less than the total stored therein.

26. A device for measuring a quantity comprising means for totalizing each of a succession of quantities, a first storage means for storing a measured total, means operable at predetermined times to transmit said total from the totalizing means to the storage means in inverse ratio whereby only the smallest measured total is transferred, a second storage means, and means operable at predetermined times to transmit the total from the first storage means to the second storage means in inverse ratio whereby only the largest total stored by the first storage means is transmitted.

FRANK C. AMSBARY, Jr.
STUART G. MOORE.

References Cited in the file of this patent
UNITED STATES PATENTS

| Number | Name | Date |
| --- | --- | --- |
| 1,483,432 | Hall | Feb. 12, 1924 |
| 2,259,314 | Lewis et al. | Oct. 14, 1941 |